United States Patent [19]

Bass et al.

[11] Patent Number: 5,533,100
[45] Date of Patent: Jul. 2, 1996

[54] COMMUNICATIONS SYSTEM CALL COMPLETE ARRANGEMENT

[75] Inventors: Saundra V. Bass, Somerset; Donald L. Blosser, Freehold; Andre K. Crump, Summit; David B. Kerr, Fogelsville; Frank C. LaPorta, Millington; Ted M. Ricci, Atlantic Highlands; William H. Stenger, Sr., Marlboro, all of N.J.

[73] Assignee: AT&T Corp., Murray Hill, N.J.

[21] Appl. No.: 282,450

[22] Filed: Jul. 29, 1994

[51] Int. Cl.$^6$ .................................................. H04M 1/64
[52] U.S. Cl. .................. 379/67; 379/88; 379/89; 379/209; 379/245
[58] Field of Search .................. 379/209, 142, 379/245, 246, 247, 249, 67, 88, 89, 217, 374, 113, 309

[56] References Cited

U.S. PATENT DOCUMENTS

| | | | |
|---|---|---|---|
| 4,166,929 | 9/1979 | Sheinbein | 379/209 |
| 4,476,349 | 10/1984 | Cottrell et al. | 179/18 |
| 4,567,323 | 1/1986 | Lottes et al. | 379/201 |
| 4,661,975 | 4/1987 | Brecher | 379/215 |
| 4,720,848 | 1/1988 | Akiyama | 379/217 |
| 4,800,583 | 1/1989 | Theis | 379/67 |
| 4,873,719 | 10/1989 | Reese | 379/215 |
| 4,878,239 | 10/1989 | Solomon et al. | 379/211 |
| 4,893,325 | 1/1990 | Pankonen et al. | 379/45 |
| 4,930,152 | 5/1990 | Miller | 379/214 |
| 4,939,771 | 7/1990 | Brown et al. | 379/67 |
| 4,941,167 | 7/1990 | Cannalte et al. | 379/142 |
| 4,942,598 | 7/1990 | Davis | 379/57 |
| 4,975,944 | 12/1990 | Cho | 379/209 |
| 5,007,076 | 4/1991 | Blakely | 379/67 |
| 5,029,196 | 7/1991 | Morganstein | 379/67 |
| 5,063,588 | 11/1991 | Patsiokas et al. | 379/57 |
| 5,113,429 | 5/1992 | Morley, Jr. et al. | 379/88 |
| 5,153,905 | 10/1992 | Bergeron et al. | 379/209 |
| 5,155,761 | 10/1992 | Hammond | 379/67 |
| 5,157,715 | 10/1992 | Naddor et al. | 379/92 |
| 5,181,236 | 1/1993 | LaVallee et al. | 379/67 |
| 5,185,782 | 2/1993 | Srinivasan | 379/67 |
| 5,216,709 | 6/1993 | Wen et al. | 379/355 |
| 5,245,651 | 9/1993 | Takashima et al. | 379/96 |
| 5,247,568 | 9/1993 | Bergsman et al. | 379/67 |
| 5,249,221 | 9/1993 | Ketring | 379/214 |
| 5,263,084 | 11/1993 | Chaput et al. | 379/215 |
| 5,268,957 | 12/1993 | Albrecht | 379/209 |
| 5,276,731 | 1/1994 | Arbel et al. | 379/88 |
| 5,282,243 | 1/1994 | Dabbaghi et al. | 379/201 |
| 5,303,301 | 4/1994 | Takahata | 379/142 |
| 5,313,516 | 5/1994 | Afshar et al. | 379/142 |
| 5,333,180 | 7/1994 | Brown et al. | 379/67 |
| 5,402,472 | 3/1995 | Melampy et al. | 379/214 |
| 5,425,091 | 6/1995 | Josephs | 379/209 |

FOREIGN PATENT DOCUMENTS

| | | | |
|---|---|---|---|
| 0480233 | 4/1992 | European Pat. Off. | 379/209 |
| 0154254 | 7/1986 | Japan | 379/209 |
| 0285052 | 11/1988 | Japan | 379/142 |
| 0284151 | 11/1989 | Japan | 379/142 |

Primary Examiner—Jeffery Hofsass
Assistant Examiner—Parag Dharia
Attorney, Agent, or Firm—Frederick B. Luludis

[57] ABSTRACT

A facility is disposed in a telecommunications network to provide an alternative to retrying the placing of a call to a telephone station when a busy signal is encountered. More particularly, if a subscriber places a telephone call to a called station set that is busy with another telephone call, then the facility notes that fact and terminates the subscriber's telephone call. Thereafter, the facility places a telephone call to the called station and, when the call is answered, announces at least the calling subscriber's telephone number and allows the called party to optionally extend the call back to the original calling subscriber. If the call is not answered, then the call back is terminated, and the placement of another call to the called station is rescheduled for a subsequent time.

6 Claims, 5 Drawing Sheets

COMMUNICATIONS SYSTEM CALL COMPLETE ARRANGEMENT

TECHNICAL FIELD

The invention relates to telecommunications networks and more particularly relates to a telecommunications service.

BACKGROUND OF THE INVENTION

Many telephone subscribers are annoyed at hearing a busy signal when they place a telephone call to a party whose telephone line is busy. One possible reason for this is that the busy signal means that the caller will have to try to place the call again at some later time, usually within minutes (or seconds) of the initial attempt of placing the call to the desired called party. Disadvantageously, it is not unusual for a caller to make numerous attempts at placing a call to the desired called party and hearing a busy signal as the result of each such attempt. In fact, it is also not unusual for a caller "to give up" trying to reach the desired party.

SUMMARY OF THE INVENTION

The art of telecommunications services is advanced by providing a service that operates to assume control over attempting to reach a desired called party in behalf of a calling subscriber whose initial attempt at completing the call resulted in encountering a busy condition. Specifically, when a subscriber places to call to a called station that is busy, then the telephone call is terminated and thereafter, in accord with an aspect of the invention, the inventive service automatically places a call to said called station and, if the call is answered, announces at least the telephone number of the calling party and presents the called party the option of completing the call to the subscriber.

DETAILED DESCRIPTION

Figure 1:
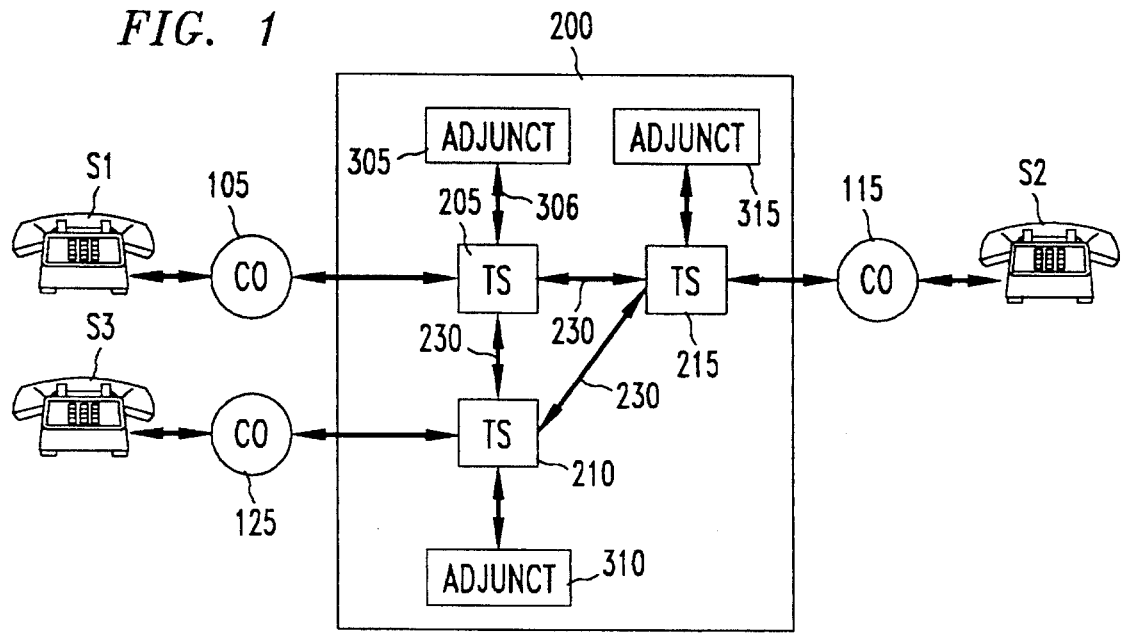
FIG. 1 illustrates in block diagram form a telecommunications system in which the principles of the invention may be practiced.

In an illustrative embodiment of the invention, interexchange network 200 shown in FIG. 1 provides a plurality of services for its subscribers, such as the subscribers associated with station sets S1 through S3. Specifically, network 200 includes, inter alia, a plurality of interconnected Toll Switches (TS), three of which are shown in the FIG., namely TS 205, 210 and 215. Such toll switches (e.g., 205, 210 and 215) may by any one of the well-known types of switching equipments, such as, for example, the No. 4 ESS (Electronic Switching System) that is available from AT&T. In a typical case, a toll switch is associated with a number of local Central Offices (CO), three of which are shown in the FIG., namely, COs 105, 115 and 125. As is well-known, a CO, e.g., CO 105, is arranged to connect a calling station (originator) that has dialed a particular telephone number to an associated toll switch, e.g., TS 205. In doing so, the CO sends associated calling information including, inter alia, the dialed (called) telephone number and telephone number of the calling station to the toll switch. The CO may supply such information to the toll switch via one of a number different conventional signaling arrangements, for example, in-band signaling the information is transmitted over the call connection to the toll switch. A CO is also arranged to advance a telephone call received from its associated toll switch to an intended telephone station set, e.g., station set S1, in which the toll switch supplies the calling information to the CO via, e.g., in-band signaling over the call connection to the CO.

It is seen from the FIG. that a toll switch, e.g., TS 205 may be associated with an adjunct, e.g., adjunct 305. That is, an adjunct may be associated with one or more toll switches. In an illustrative embodiment of the invention, an adjunct includes a voice interactive system, e.g., the well-known CONVERSANT (trademark of AT&T) voice interactive system available from AT&T, as well as a database system, which may be, for example, the VAX 4000 available from the Digital Equipment Corporation. The database system, more particularly, is used for the storage and processing of subscriber records identifying a subscriber's subscription of network 200 services that may be invoked in conjunction with telephone calls placed and/or received by the subscriber. (It is noted that adjuncts 310 and 315 associated with toll switches TS 210 and 215, respectively, are similar to adjunct 305. Accordingly, a discussion of adjunct 305 equally pertains to the other adjuncts). One network 200 service that a subscriber may subscribe to is a call completion service defined by the instant invention.

Specifically, assume that the telephone user associated with station S1 subscribes to the inventive call completion service and places a telephone call to station S2 by dialing the telephone number associated with station S2, for example, the telephone number of 908-NXX-XXXX. CO 105, responsive thereto, forwards the call and associated calling information (i.e., 908-NXX-XXXX and calling telephone number) to TS 205. TS 205, in turn and in a conventional manner, determines, based on the calling party's ANI (Automatic Number Identification) whether the caller is eligible for network 200 services, including the inventive service. TS 205 does this by indexing a so-called originating number table using the caller's ANI to determine if the caller's ANI is associated with an adjunct, e.g., adjunct 305. If that turns out to be the case, then TS 205 passes the call and associated call information (ANt, called number, etc.,) to the identified adjunct, e.g., adjunct 305, via communications path 306.

If the caller's ANI is not stored in the accessed table, then TS 205 processes the call in a conventional manner. That is, TS 205 forwards the call to TS 215 for routing to station S2 via CO 115.

In an illustrative embodiment of the invention, communications path 306 may be, for example, a digital communications path having a plurality of digital voice channels for establishing telephone connections between adjunct 305 and TS 205. One such channel may be used for exchanging signaling messages between TS 205 and adjunct 305. Accordingly, responsive to receipt of the aforementioned calling information via the signaling channel, adjunct 305 supplies the caller's ANI to its associated database to obtain a copy of a record identifying the various network 200 services associated with the ANI. Assuming that the caller subscribes to the inventive service and that subscription is noted in the associated record, then adjunct 305 supplies the called number to its database to determine if network 200 serves the called NPA-NXX (Number Plan Area). If not, then adjunct 305 passes the call back to TS 205 and advises TS 205 that network 200 services do not apply to the call and to route the call in a conventional manner. If so, then adjunct 305 places a telephone call to the called number. Adjunct 305 does this by sending a call set-up message containing the called number to TS 205 via the aforementioned signaling channel. The message also includes the identity of the voice channel that should be used to extend the call connection from TS 205 to adjunct 305. TS 205, responsive to the receipt of the message, establishes a conventional call connection to TS 215 and sends the called telephone number thereto via a conventional network 200 signaling path (e.g., a common channel signaling path). TS 215, responsive to receipt of the call, forwards it to CO 115, which then extends the call connection to station S2 and applies a conventional ringing signal thereto. CO 115 then returns a signaling message to that effect to TS 215, which then passes the message to TS 205 via the aforementioned network 200 signaling path (hereinafter "CCS path"). TS 205, in turn, passes the message to the originator of the call, namely adjunct 305, via the aforementioned signaling channel 306. Adjunct 305, responsive to receipt of the message, directs TS 205 to merge the newly established connection with the connection extending to station S1. Accordingly, when the station S2 user answers the call, then the calling and called parties may communicate with one another.

Assume at this point that station S2 is busy—meaning that station S2 is in an off-hook state (i.e., busy). If that is the case, then CO 115 does not send a ringing signal to station S2, but returns a conventional busy signaling message to TS 215. TS 215, in turn, forwards a message indicative of the station S2 busy state to TS 205 via the network CCS path (not shown). TS 205, in turn, passes the message to adjunct 305.

Adjunct 305, responsive to receipt of the message, notifies the calling party that the called number is busy and presents the calling party with the option of invoking the inventive service. The calling party may invoke the service by entering a particular code (e.g., *234) via the station S1 key pad. If the calling party does not do so, then the calling party may terminate the call in a conventional manner. (It is noted that if the calling party does not respond to the prompt within a predetermined period of time and does not "hang up" the call, then adjunct 305 repeats the prompt and returns the call to TS 205 for normal call processing if the calling party does not respond thereto within such a period of time.)

Assuming that the calling party enters the aforementioned code, then adjunct 305 returns an announcement indicating that network will make a number of attempts (e.g., six) over a predetermined interval to reach the called party for the subscriber. Adjunct 305 then stores the calling information and the current time of day in its associated database. Adjunct 305 then associates the call with a database timer set for a particular interval of time, e.g., 10 minutes, activates the timer and then disconnects (terminates) the call.

When the aforementioned timer expires, then the adjunct 305 database alerts adjunct 305 to that fact and passes the calling information associated with the expired timer as well as the name of the associated subscriber (i.e., the station S1 subscriber's name) thereto. Adjunct 305, responsive to receipt of such information, places a call to the called number in the manner described above. If the called number is again found to be busy, or does not answer the call within a predetermined interval, then adjunct 305 disconnects the call as discussed above, and then checks to see if a predetermined number of attempts (e.g., six) have been made to reach the called party. If that is not the case, then adjunct 305 resets the aforementioned timer so that it will be prompted subsequently to make another attempt to reach the called party. If adjunct 305 finds that it has made six attempts to complete the call, then adjunct 305 notes that fact in its associated database and exits, thereby ending further processing of the call.

Assume at this point that the user associated with station S2 answers one of the call attempts made by adjunct 305. CO 115, responsive to such answering, returns a message of that fact to TS 215, which then forwards the message to TS 205 via the network CCS path. TS 205, in turn, notifies adjunct 305 via signaling channel 306 that the called party answered the call. In that event, adjunct 305 transmits an announcement to station S2. An example of such an announcement may be worded as follows:

"(name of caller) at (area code and telephone number) tried to reach you while your line was busy. (1)

(Name of caller) will accept the charges for your return call if you press "1", or you may place this call later." (It is noted that adjunct 305 inserts the appropriate information for the name and telephone number of the caller, which information is contained in the caller's (subscriber's) subscription record stored in the associated database.)

If the station S2 user presses the digit 1 on the station S2 keypad, and that fact is returned to adjunct 305 in a conventional manner, then adjunct 305 places a telephone call to the telephone number identified in the transmitted announcement. Adjunct 305 places the call by sending a call set-up (connect) message containing the identified telephone number to TS 205. TS 205, in turn, establishes a conventional telephone connection to CO 105 and forwards the call thereto. CO 105, in turn, extends the call connection to station S1 and applies conventional ringing signals thereto. If the call placed to station S1 is answered, then CO 105 returns a signaling message indicative thereof to TS 205, which then forwards the message to adjunct 305 via the path 306 signaling channel. Adjunct 305, in response to receipt of the message, then "bridges" the call connections to stations S1 and S2. At that point, the calling and called panics may communicate with one another.

If the call to station S1 is not answered (within a predetermined period of time) or is found to be busy, adjunct 305 then waits a predetermined amount of time and then disconnects the call connection.

If the station S2 user does not press the digit 1 in response to hearing announcement 1, then adjunct 305 may retransmit announcement 1. If the station S2 user still does not press the digit 1, then adjunct 305 terminates the connection to station S2. In addition, adjunct 305 erases the call information associated with the call from the adjunct 305 database and terminates the aforementioned call attempt timer. Such information is also erased from the database when the station S2 user fails to answer the last of the predetermined number of calls that adjunct 305 places to station S2.

Figure 2:
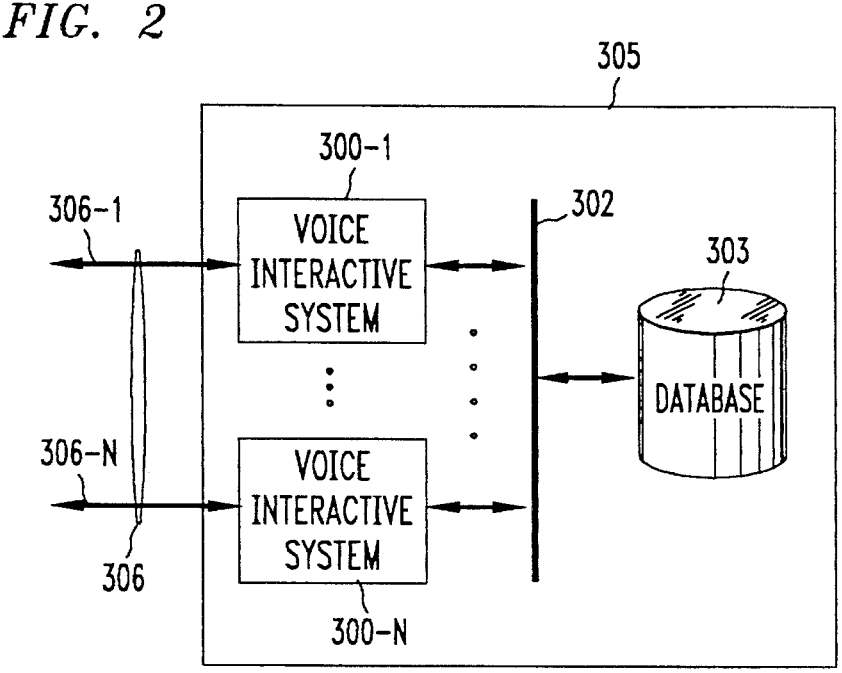
FIG. 2 illustrates in block diagram form the adjunct of FIG. 1.

Turning now to FIG. 2, there is shown a broad block diagram of an adjunct, e.g., adjunct 305. An adjunct, more particularly, includes one or more voice interactive systems 300-1 through 300-N based on the level of traffic that it processes. It also includes a Local Area Network 302, which interfaces the voice interactive systems with database 303. As mentioned above, database 303 is used for the storage of subscriber records, and records associated with the various services forming the subscriber's subscription of services.

Figure 3:
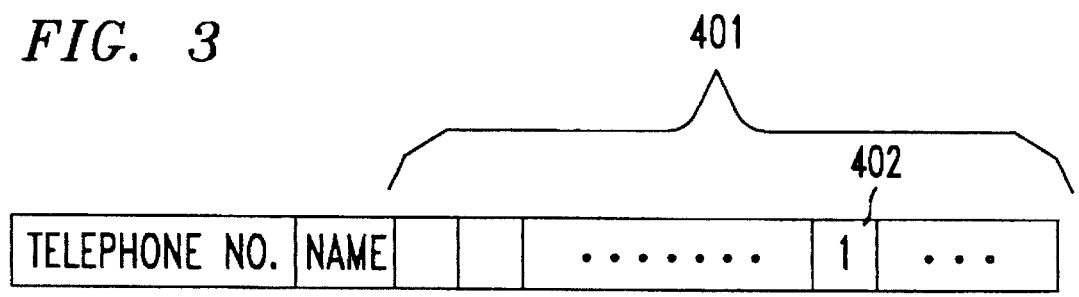
FIG. 3 is an illustrative example of a subscriber record that may be stored in the database of FIG. 2.

An example of a subscriber record is shown in FIG. 3, in which a service record includes the subscriber's name and telephone number and a number of fields 401 identifying the subscriber's subscription of services. For example, if the subscriber subscribes to a number of different network 200 services, then associated ones of fields 401 contain a particular value, e.g., a binary one. If the subscriber does not subscribe to a particular one of the services, then its associated field 401 contains a different value, e.g., a zero. For example, assuming that field 402 is associated with the inventive service, then that field of the subscriber's associated record contains a one.

Figure 4:
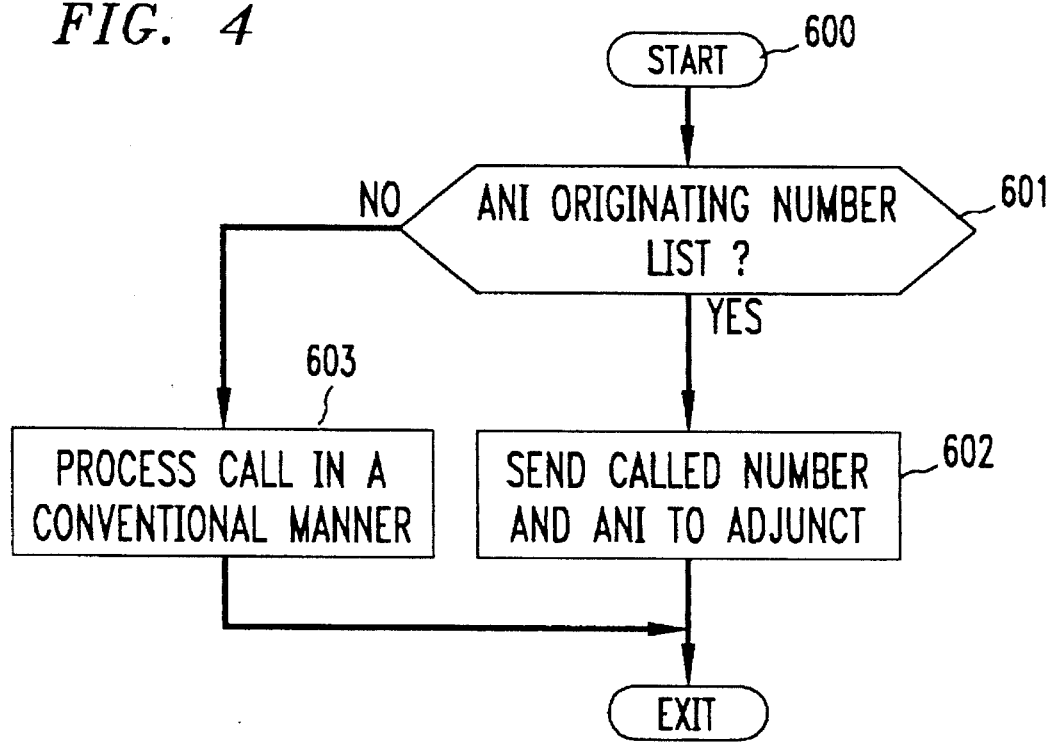
FIGS. 4 through 7 illustrate in flow chart form the program which implements the invention in the system of FIG. 1.

When a toll switch, e.g., TS 205, receives an incoming call from an associated CO, then the main processing program stored in TS 205 enters the program of FIG. 4. When it is entered (block 600), the program (block 601) checks to see if the calling telephone number (ANI) is contained in its originating number list. If it is, then the program (block 602) forwards information associated with the call, e.g., called number and ANI, to its associated adjunct, e.g., adjunct 305, as discussed above. The program then exits. If the calling number is not in the list, then the program (block 603) passes the call to its main call processing program, which then forwards the call to its intended destination, as also discussed above.

Figure 5:
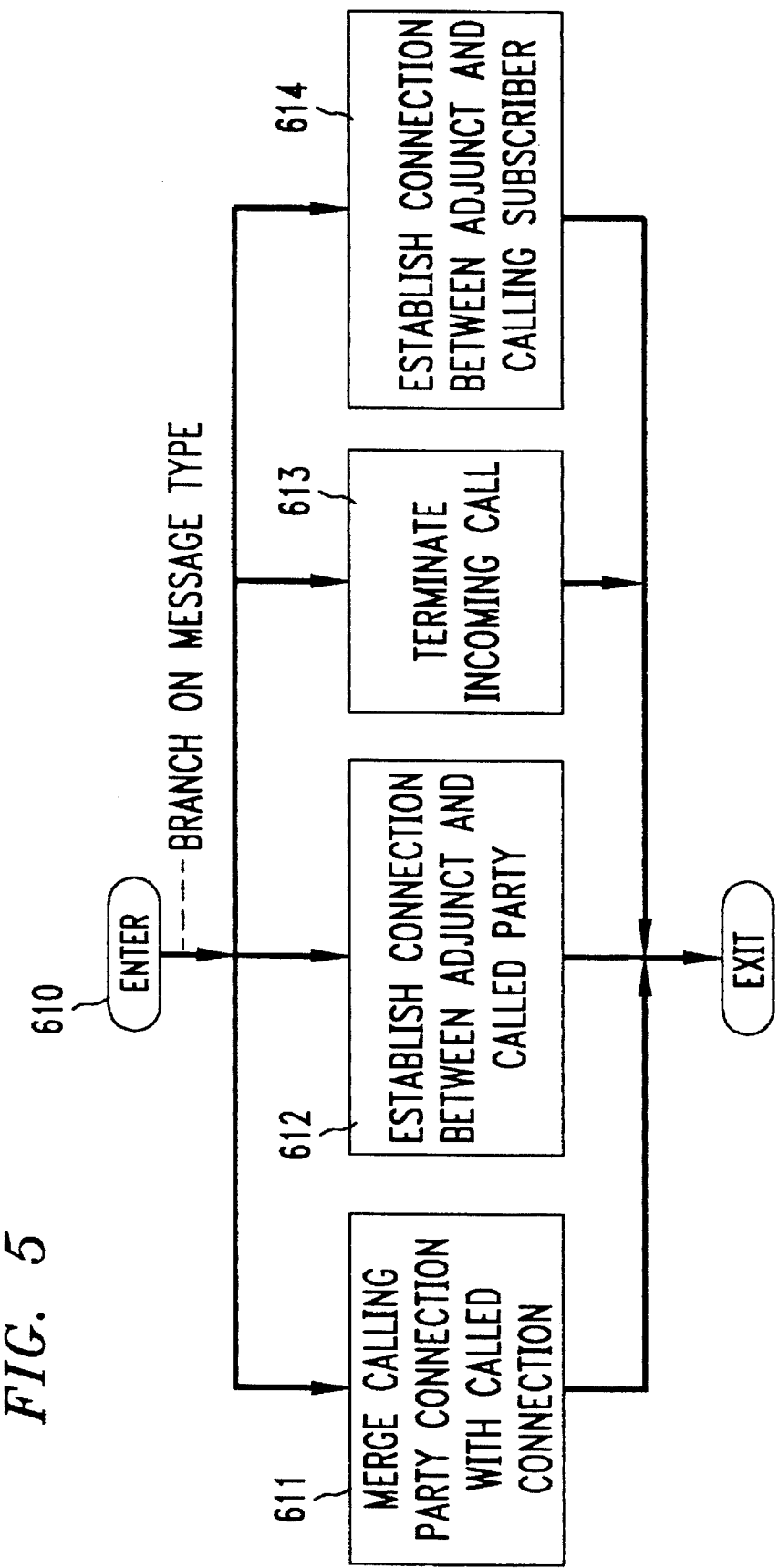

When the toll switch receives a message from the adjunct, then the main processing program enters the program of FIG. 5. When entered (block 610), the program branches to one of a number of different software routines represented by blocks 611 through 615 based on the type of message received from adjunct 305. As discussed above, the message could be a request to (a) merge (block 611), (b) establish a connection between the adjunct and called party (block 612), (c) terminate the call (block 613) or (d) establish a connection between the adjunct and calling subscriber (block 614).

Figure 6:
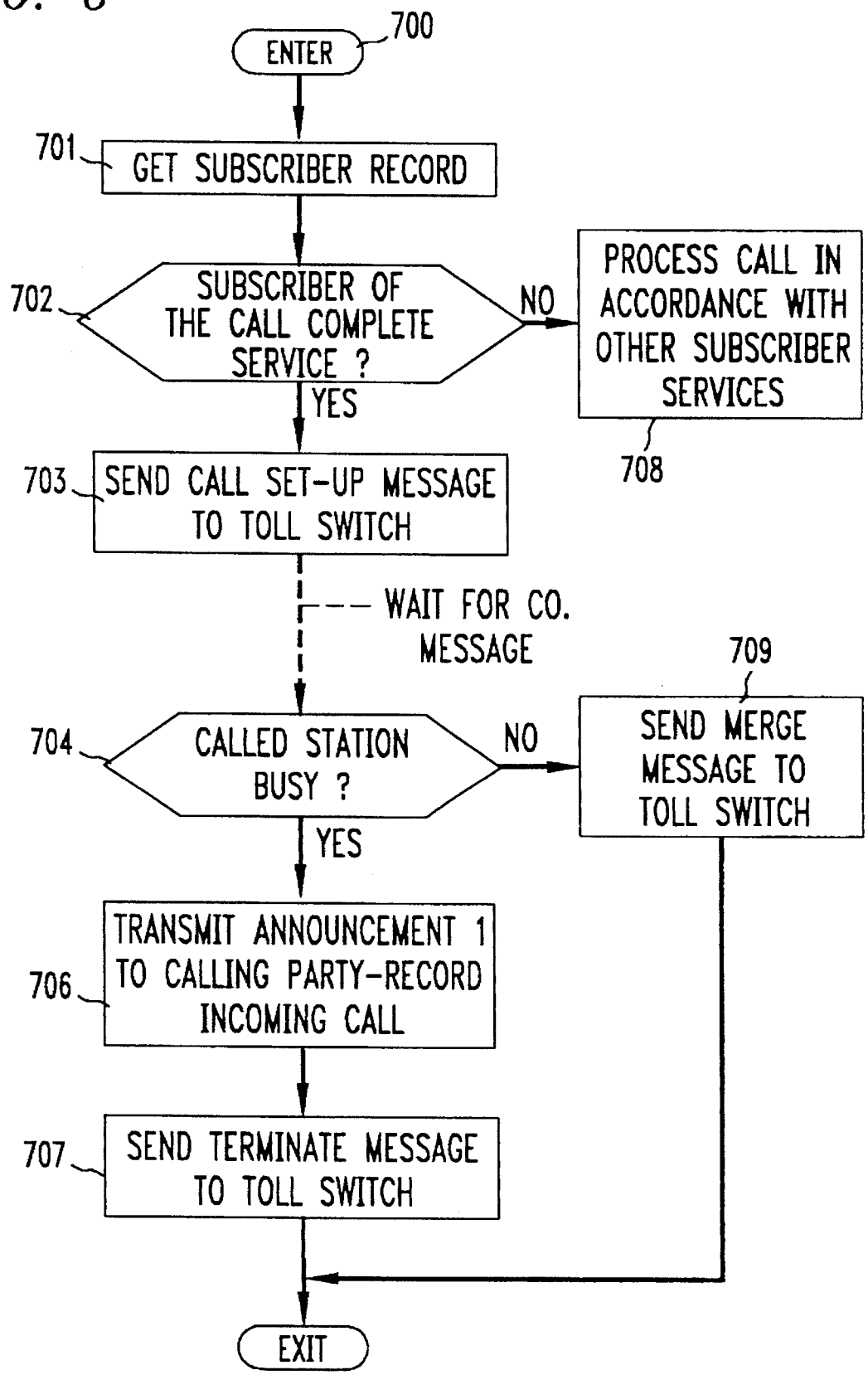

When an adjunct receives an initial message containing an ANI from its associated toll switch, the adjunct enters the program shown in FIG. 6. When entered (block 700), and as discussed above, the program obtains a copy of the associated subscriber record from its associated database (block 701). The program (block 702) then checks the record to see if the calling subscriber subscribes to the inventive call completion feature. If that is not the case, then the program passes the record to the software module (represented by block 708) that is designed to process the subscriber's subscription of other services. Otherwise, the program (block 703) sends a message to its associated toll switch directing the latter to connect the adjunct to the called station. The program then waits to see if it receives an indication that called station is busy from the CO handling the call. If the program (block 704) does not receive such an indication but receives an indication that the CO is ringing the called station, then the program (block 709) sends a merge message to its associated toll switch. Otherwise, the program transmits an announcement (block 706) to determine if the calling party wants to invoke the call completion service. If the calling party does not invoke the service by failing to enter *234 as prompted by the announcement, then the program terminates the call (block 707). If the calling party does invoke the service in the manner discussed above, then the program (block 706) (a) records the associated call information in database 303 and (b) transmits an announcement indicating that the service has been invoked and that a number of attempts to reach the called party will begin shortly. The program then terminates the call connection to the calling party and then exits.

Figure 7:
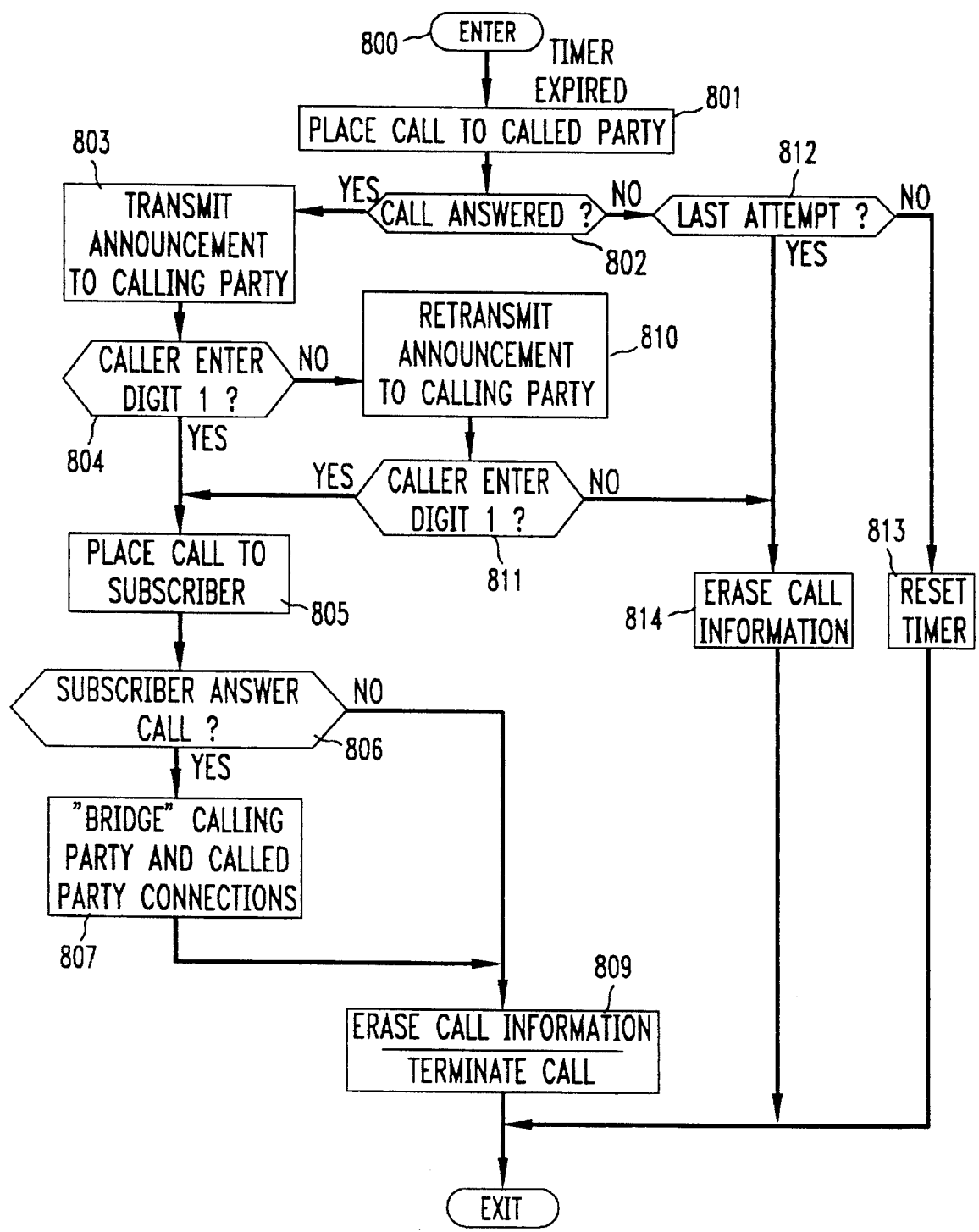

FIG. 7 is a flow chart of the main adjunct program. The flow of the program and actions that are taken at blocks 801 through 814 may be easily understood when read in conjunction with the foregoing detailed description.

The foregoing is merely illustrative of the principles of the invention. Those skilled in the art will be able to devise numerous arrangements, which, although not explicitly shown or described herein, nevertheless embody those principles that are within the spirit and scope of the invention. For example, the adjunct database may be arranged to store different versions of the subscriber's name (e.g., aliases, names of other members of the subscriber's family, business name etc,). Thus, when the calling subscriber invokes the service, the adjunct can offer the caller the option of selecting which of the stored "aliases" that is to be presented to the called party. As another example, adjunct 305 may be arranged so that it recognizes spoken responses from the calling/called party as an alternative to a keypad entry. For example, the called party may respond to announcement 1 by saying 'yes' rather than pressing digit 1 of the station set keypad. As a further example, adjunct 305 may be arranged so that it allows the calling party to set the number of call attempts, the interval between each such attempt and/or the time of day that such call attempts are to start. As a further example, adjunct 305 may be arranged so that the number of call attempts is adjusted as a function of the call congestion in the network 200.

As discussed above, the inventive service is offered to a calling subscriber when the called station is found to be busy. It is recognized that adjunct 305 may be arranged to offer the service when other calling conditions are present, such as (a) if the called station does not answer within a predetermined period of time, (b) if the call is blocked due to some network condition, etc. In the case where the busy or ringing tone do not meet North American signaling standards, and therefore, would not be recognized by adjunct 305, then adjunct 305 may be arranged so if the called station does not answer within a first interval of time, then adjunct 305 presents an announcement offering the call completion service to the caller and then waits for a second interval of time for either the calling party to invoke the service or the call to be answered. At the end of the second interval, adjunct 305 then announces that the call cannot be completed and reminds the caller that the call completion service is available. As a further example, the calling subscriber may mute (turn off) an announcement that is being transmitted by adjunct 305 by pressing (entering) the digit 5 on the keypad. As still a further example, the subscriber may elect to have adjunct 305 announcements transmitted in a language chosen by the subscriber. Moreover, announcements presented to the called party may also be in a language selected by the subscriber and may be language different from the language of the announcements transmitted to the calling subscriber. Also, announcements presented to the called party may also be in a language selected by the country code that is part of the called telephone number. Thus, if a call is placed overseas to a particular country, then announcements presented to the called party could be in the language of that country. The latter announcements may also be presented in the English language as well as the overseas language (time of day in the called oversea destination is announced to the calling party).

We claim:

1. A method of processing a telephone call from a calling telephone station to a called telephone station, said calling telephone station being associated with a particular telephone number, said call being routed over a telephone network, said method comprising the steps of receiving said telephone from said calling station and determining if said called telephone station is busy, if said called telephone station is not busy, then connecting said calling telephone station to said called telephone station via said telephone network, if said called telephone station is busy, storing said calling telephone number and at least the time of said telephone call in memory and terminating said telephone call, and following an expiration of a predetermined period of time, placing a telephone call to said called telephone station and presenting said stored calling telephone number and said time of said telephone call to a user associated with said called telephone station, and wherein said step of terminating includes the step of responsive to said calling number including a country code, announcing to a calling party at said stored calling station the time for said call at said called station.

2. The method of claim 1 wherein said step of placing and presenting includes the step of presenting a name identifying said calling party to said called party.

3. The method of claim 2 wherein said name is an alias associated with said calling party.

4. The method of claim 2 wherein said step of presenting includes the step of announcing at least said telephone number in a language selected by the calling party and transmitted to the called party.

5. The method of claim 2 wherein said telephone number includes a country code and wherein said step of presenting includes the step of announcing to the called party at least said telephone number in a language selected as a function of said country code.

6. The method of claim 2 wherein said telephone number includes a country code and wherein said step of presenting includes the step of announcing to the called party at least said telephone number in a language selected as a function of said country code and in a language commonly spoken in a geographical area in which said calling station is located.

* * * * *